United States Patent [19]

Doggett

[11] Patent Number: 4,614,306

[45] Date of Patent: Sep. 30, 1986

[54] PIVOTING PROTECTOR FOR FOOD PROCESSOR FEED TUBE

[75] Inventor: Lawrence A. Doggett, Kettering, Ohio

[73] Assignee: KitchenAid, Inc., St. Joseph, Mich.

[21] Appl. No.: 659,381

[22] Filed: Oct. 10, 1984

[51] Int. Cl.[1] .............................................. B02G 18/16
[52] U.S. Cl. ..................................... 241/37.5; 16/257; 16/266; 16/DIG. 13; 241/92; 241/282.1; 241/285 A; 241/285 B
[58] Field of Search ......... 16/257, 259, 266, DIG. 13; 241/36, 37.5, 92, 199.12, 282.1, 282.2, 285 R, 285 A, 285 B; 366/150, 349, 347; D7/378, 384

[56] References Cited

U.S. PATENT DOCUMENTS

| 4,216,917 | 8/1980 | Clare et al. | 241/37.5 |
| 4,226,373 | 10/1980 | Williams | 241/37.5 |
| 4,471,915 | 9/1984 | Levin et al. | 241/37.5 |

OTHER PUBLICATIONS

European Patent Application Publication No. 0 084 745, John Behringer, published Aug. 3, 1983, and an English translation thereof.
Instruction brochure for Sunbeam Food Processor.

Primary Examiner—Howard N. Goldberg
Assistant Examiner—Timothy V. Eley
Attorney, Agent, or Firm—Biebel, French & Nauman

[57] ABSTRACT

A protector for a feed tube of a food processor comprises a feed tube cover hingedly mounted to a bowl cover for pivotal movement of the feed tube cover between a closed position over the feed tube and an opened position retracted from the feed tube. A food pusher is detachably coupled to the feed tube cover for reciprocal motion within the feed tube. A latch permanently mounted to the feed tube cover secures the feed tube cover to the bowl cover and operates interlock means to enable operation of the food processor only when the feed tube is properly protected by the feed tube cover. The food pusher includes a hollow pusher shaft which forms a reduced size secondary feed tube into which a secondary food pusher is inserted and detachably secured.

9 Claims, 4 Drawing Figures

PIVOTING PROTECTOR FOR FOOD PROCESSOR FEED TUBE

BACKGROUND OF THE INVENTION

This invention relates generally to food processors and, more particularly, to a protector for limiting the access to a wide mouth feed tube of a food processor during operation of the food processor to protect against potential injury.

Food processors are a well known convenience for preparing food by slicing, grating, shredding or similar food processing operations. A conventional form of food processor includes a working bowl having a motor driven shaft projecting upwardly in the center of the bowl. A variety of food processing tools are coupled to the shaft and rotated to perform a corresponding variety of food processing operations as required by the operator of the food processor.

A detachable bowl cover is secured to the working bowl during operation of the food processor. The bowl cover defines a feed tube for introducing food items to be processed through the bowl cover into the bowl. Foods to be processed are placed into the feed tube and then pushed through the tube into engagement with a processing tool by means of a food pusher which is formed to be slidingly inserted into the feed tube.

Frequently, feed tubes for food processors are relatively tall, narrow structures provided with a pusher which prevents an adult from inadvertently inserting a normal hand through the feed tube and into contact with a rotating tool located in the upper portion of the working bowl. A safety interlock is provided to prevent the food processor from operating until the bowl cover is firmly secured to the bowl in its proper operating position.

The interlock is performed by a projection or cam formed on the bowl cover which causes the closing of a switch carried by the base of the food processor only when the bowl cover is properly secured to the bowl. Various designs provide for the operation of the switch directly or through intermediate mechanical linkages. Alternately, the switch may be magnetically activated by properly positioning and securing the bowl cover.

Unfortunately, the tall, narrow feed tubes also limit the size, shape and single load quantity of a food item which can be processed. To process larger sizes, larger single load quantities and variously shaped food items, for example, to slice relatively large size tomatoes or to lengthwise slice carrots, cucumbers or the like, enlarged feed tubes have been provided. Of course, safety considerations still apply and, hence, alternate safety or protection arrangements must be provided for such enlarged feed tubes.

One protector for an enlarged feed tube is disclosed in Williams, U.S. Pat. No. 4,226,373. The Williams feed tube protector comprises a sleeve which is sized and shaped to be slid over the feed tube of the food processor with the sleeve including an actuator for enabling motor operation only when the sleeve is properly positioned over the feed tube.

A telescoping food pusher which is sized to be received within the feed tube is captively connected to the sleeve such that the food pusher may be moved up and down within the feed tube, but may not be removed from the sleeve. In Williams, the captured food pusher blocks access through the enlarged feed tube when the sleeve is properly positioned over the feed tube to enable operation of the food processor.

Another approach to protection of an enlarged feed tube is disclosed by Behringer et al. in European Patent Publication No. 0084745. A cylindrical hopper nearly equal in diameter to the working bowl forms a combination bowl cover and enlarged feed tube, and is secured to the working bowl. The enlarged cylindrical feed tube includes a radially extending partition to prevent food from being circulated by the processing tool which is to work upon it. The enlarged cylindrical feed tube is closed by a feed tube cover which must be properly positioned over the feed tube before the food processor motor may be operated. An opening in the cover admits a food pusher including a pusher plate which is slotted to receive the partition.

While both Williams and Behringer et al. protect enlarged feed tube openings, the associated protection devices must be completely detached from the food processor and set aside while food to be processed is loaded into the enlarged feed tubes. The protection devices must then be replaced before the food processor can be operated. Removal and replacement of the protective devices is inconvenient and the protective devices, once removed, occupy counter space and may interfere with activities associated with operation of the food processor. Further, since the protective devices are completely removed and set aside from the food processor, they may be temporarily mislaid leading to delays and frustration in use of the food processor.

It is, thus, apparent that the need exists for an improved protector for an enlarged feed tube of a food processor which does not require removal from the food processor for accessing the enlarged feed tube to facilitate loading and operation of the food processor.

SUMMARY OF THE INVENTION

The deficiencies of the prior art solutions for the protection of an enlarged feed tube for a food processor have been corrected in accordance with the present invention wherein a feed tube protector is hingedly connected to the bowl cover defining the feed tube. The improved feed tube protector of the present invention may be pivoted to a closed position over the feed tube and may be pivoted away from the feed tube to a retracted position which permits free access to the feed tube opening by an operator of the food processor. The feed tube protector of the present invention is thus readily available to be pivoted to the closed position for operation of the food processor. Since the improved feed tube protector is not removed from the food processor during food processing operations which require repeated fillings of the feed tube, there is no possibility that it can clutter an operator's work area or be mislaid.

The improved feed tube protector of the present invention is generally applicable to food processors having a base containing a drive motor and control means for enabling the operation of the drive motor. In such food processors, a working bowl is detachably secured to the base and a shaft coupled to the drive motor projects upwardly through the bowl for rotation of a food processing tool which, in turn, is coupled to the shaft and located within the upper or lower portion of the bowl. A bowl cover is detachably secured to the working bowl and defines an enlarged feed tube for introducing food items through the bowl cover into the bowl.

The improved feed tube protector of the present invention comprises a feed tube cover which is hingedly mounted to the bowl cover for pivotal movement of the feed tube cover between a closed position over the feed tube and an opened position retracted from the feed tube. Preferably, the feed tube and operator controls are located on the same side of the food processor and the improved feed tube protector is moved to the opposite side of the food processor when pivotally retracted to the opened position.

A food pusher is coupled to the feed tube cover and aligned with the feed tube for reciprocating motion therein when the feed tube cover is in its closed position. Latch means are provided for securing the feed tube cover to the bowl cover and also for operating interlock means on the bowl cover. The interlock means in turn operate the control means to enable operation of the drive motor only when the bowl, the bowl cover and the feed tube cover are properly secured to one another and to the base of the food processor.

The food pusher comprises a pusher plate formed to slidingly fit within the feed tube for pushing food therethrough, and a pusher shaft which is fixedly connected to the pusher plate and extends upwardly through a centralized opening in the feed tube cover. A pusher head larger than the centralized opening through the feed tube cover is secured to the pusher shaft on the upper side of the feed tube cover for operation of the food pusher. Preferably, the pusher head is removably secured to the pusher shaft to enable disassembly of the food pusher from the feed tube cover for cleaning purposes.

To facilitate pivotal movement between the closed and opened positions of the feed tube cover, the improved feed tube protector further comprises support means for retaining the food pusher in a raised position with the pusher plate adjacent to the underside of the feed tube cover. For example, the support means may comprise a finger extending from the latch means for engaging the pusher plate when the latch means is moved to release the feed tube cover from the bowl cover.

It is, therefore, an object of the present invention to provide an improved protector for an enlarged feed tube of a food processor which can be pivoted between a closed protecting position over the feed tube and an opened position retracted from the feed tube without removal of the protector from the food processor; to provide an improved protector for an enlarged feed tube of a food processor which is pivotally movable between a closed position over the feed tube and an opened position retracted from the feed tube comprising a feed tube cover which must be securely latched in the closed position to enable operation of a drive motor of the food processor; and, to provide an improved protector for an enlarged feed tube of a food processor comprising a feed tube cover hingedly mountable to be pivoted between a closed position over the feed tube and a retracted position away from the feed tube, and including a feed tube pusher comprising a pusher plate positioned beneath the feed tube cover with a pusher shaft fixedly connected thereto and extending upwardly through a centralized opening in the feed tube cover, which food pusher may be latched in an upward position such that the pusher plate is adjacent to the feed tube cover to facilitate pivotal movement of the feed tube protector.

Other objects and advantages of the invention will be apparent from the following description, the accompanying drawings and the appended claims.

DETAILED DESCRIPTION OF THE INVENTION

Figure 1:
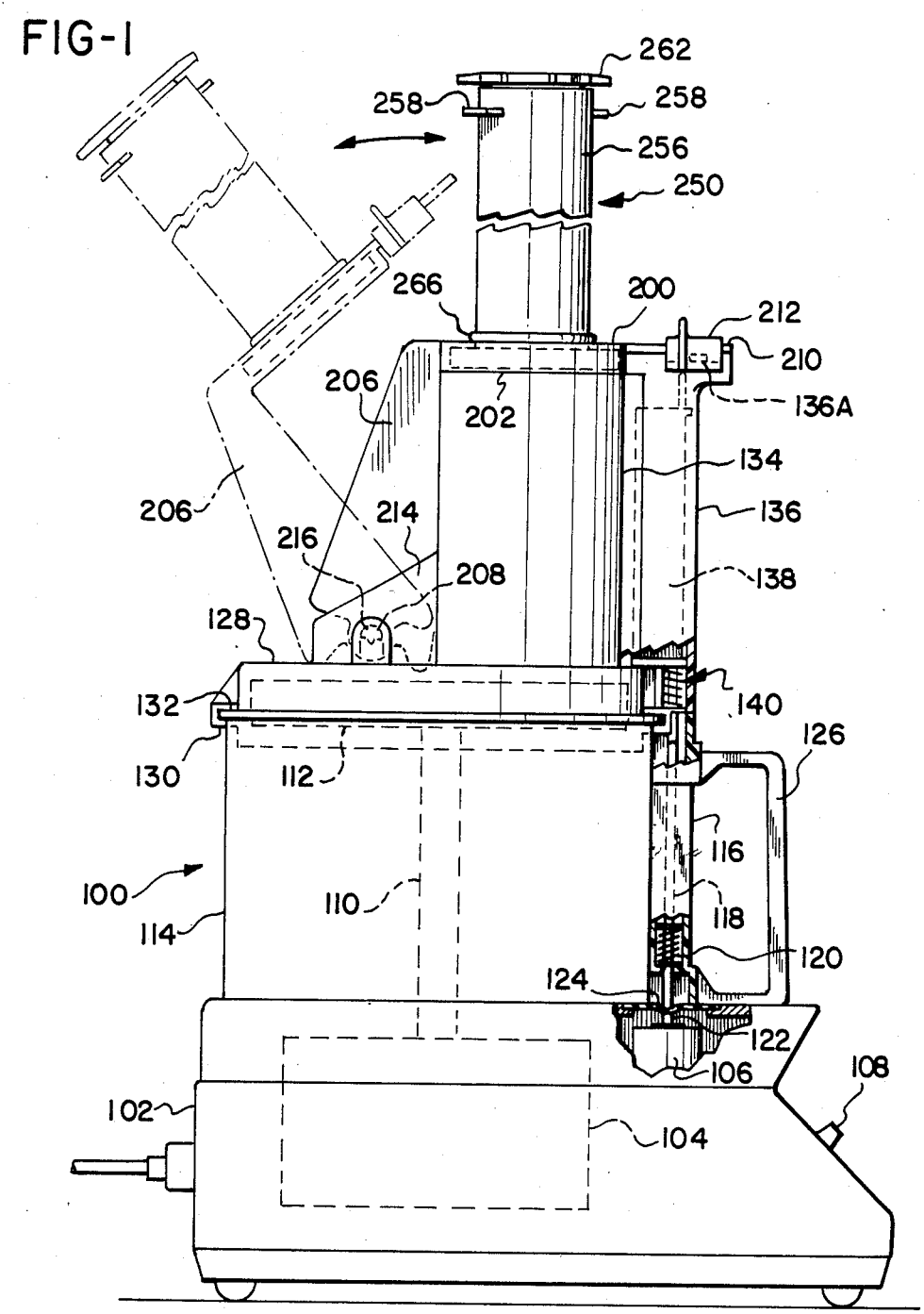
FIG. 1 is a side view of a food processor including the improved feed tube protector of the present invention with portions broken away to show internal structure.

Referring to FIG. 1, a food processor 100 includes a base 102 for housing an electric drive motor 104 and control means for enabling the actuation of the drive motor 104. In the illustrated embodiment, the control means comprise an electrical interlock switch 106 and operator controls 108 which are enabled to control the drive motor 104 only when the interlock switch 106 is operated. A vertical drive shaft 110 extends upwardly from the base 102 and is driven by the motor 104 to rotate a cutting disk 112 or other interchangeable food processing tool within the upper portion of a working bowl 114. The bowl 114 is removably secured to the base 102 by one of a variety of means well known in the art.

A vertical channel 116 is formed on the side of the bowl 114 to receive a vertically movable interlock activating rod 118 which is normally forced to the upper end of the channel 116 by means of a spring 120. When the bowl 114 is properly positioned and secured to the base 102, the activating rod 118 is aligned with an actuating pin 122 of the interlock switch 106. To prevent contamination of the interlock switch 106 and the interior of the base 102, a resilient membrane 124 covers the switch actuating pin 122. A handle 126 is formed on the working bowl 114 adjacent to the channel 116.

The opening of the working bowl 114 is closed by a bowl cover 128 which is removeably secured to the working bowl 114 by one of a variety of means well known in the art. For example, a twist lock arrangement may be used wherein two or more lugs 130 on the bowl cover 128 engage intermating ridges 132 formed around the upper edge of the working bowl 114. Formed into and extending upwardly from the bowl cover 128 is an enlarged feed tube 134 which forms a passageway through the bowl cover 128 for food items to be processed.

Figure 2:
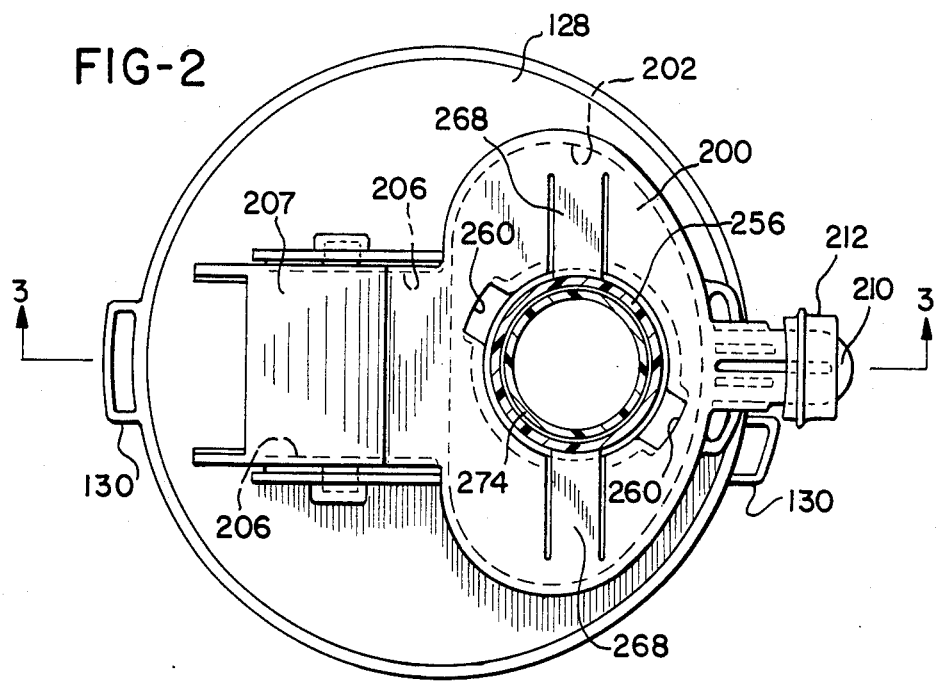
FIG. 2 is a plan view of the bowl cover and improved feed tube protector of the food processor of FIG. 1.
Figure 4:
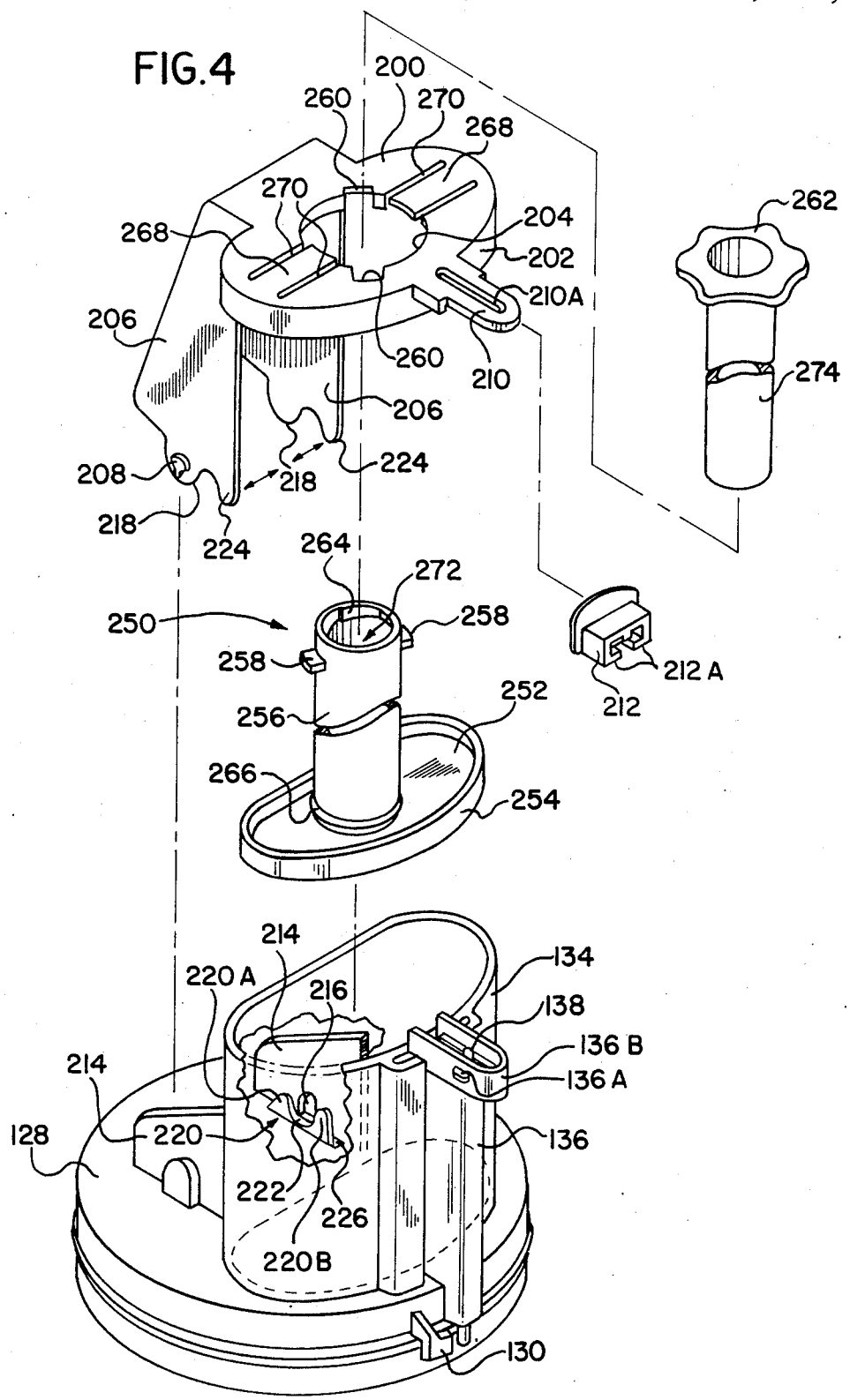
FIG. 4 is an exploded perspective view of the bowl cover and the improved feed tube protector of the present invention.

As best seen in FIGS. 2 and 4, the feed tube 134 is generally oblong in cross-section and extends from near the center of the cover 128 to near its periphery. The enlarged opening of the feed tube 134 requires a protector to prevent an adult from inserting a normal hand into the feed tube 134 and into engagement with the cutting disk 112 or other food processing tool while the food processor 100 is operating.

A vertical channel 136 extends along the feed tube 134 to house a second vertically moveable interlock activating rod 138 which is normally forced to the top of the channel 136 by means of a spring 140. It can be seen from FIG. 1 that, when the working bowl 114 is properly secured to the base 102 and the bowl cover 128 is properly secured to the working bowl 114, the actuating pin 122 of the switch 106, the interlock activating rod 118 within the channel 116 and the interlock activating rod 138 within the channel 136 are all vertically aligned with one another. To enable operation of the drive motor 104, the activating rod 138 is depressed against the resilient force of the spring 140 to in turn depress the activating rod 118 against the resilient force of the spring 120 to in turn depress the actuating pin 122 of the switch 106 to enable operation of the drive motor 104 by manipulation of the operator controls 108.

The improved feed tube protector of the present invention comprises a feed tube cover 200 having a short skirt 202 depending therefrom around its periphery. The feed tube cover 200 is formed such that the depending skirt 202 abuts with the upper end of the feed tube 134 of the food processor 100 when the feed tube cover 200 is in the closed position over the feed tube 134. The feed tube cover 200 includes a central opening or aperture 204 which is sufficiently small to prevent an adult from inserting a normal hand into the feed tube 134 when the feed tube cover 200 is in the closed position over the feed tube 134.

Figure 3:
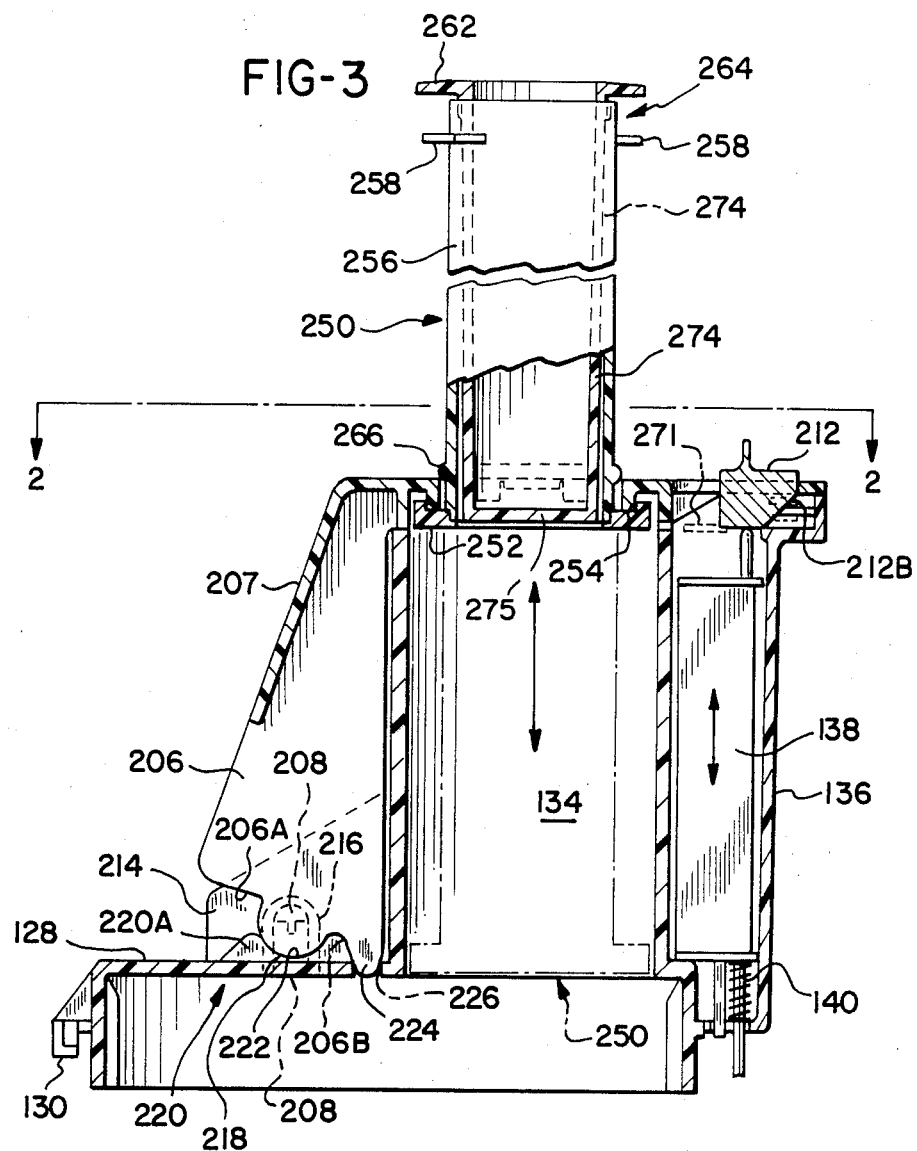
FIG. 3 is a partially sectioned side view of the bowl cover and feed tube protector taken along the section line 3—3 of FIG. 2.

Elongated hinge members 206 are interconnected by a web 207, see FIGS. 2 and 3, and extend downwardly from the feed tube cover 200. Hinge pins 208 extend from the outer surfaces of the elongated hinge members 206 near the lower ends of the elongated members 206. A tab 210 extends from the forward edge of the cover 200 for permanently receiving a movable latching member 212 as will become apparent.

Hinge brackets 214 extend from the upper surface of the bowl cover 128 and include openings or keyway slots 216 formed on the inner sides thereof. The upper ends of the keyway slots 216 are rounded to conform to the upper surfaces of the hinge pins 208 of the elongated hinge members 206. The hinge members 206 are formed of a sufficient thickness of an appropriate plastic material such that they are somewhat resilient. The hinge members 206, hence, may be gripped by an operator's hand and squeezed together to deform the hinge members 206 toward one another such that the hinge pins 208 can then be engaged or disengaged from the keyway slots 216 in the hinge brackets 214 to connect or disconnect, respectively, the feed tube cover 200 and the bowl cover 128.

To support the feed tube cover 200 for hinged movement between a closed position over the feed tube 134, as shown in solid lines in FIG. 1, and a retracted position retracted from the feed tube 134, as shown in dash-dot lines in FIG. 1, the lower ends of the elongated hinge members 206 include rounded supporting surfaces 218. Feed tube cover support blocks 220, see FIGS. 3 and 4, are positioned on the inside surfaces of the hinge brackets 214 adjacent to the keyway slots 216 and define rounded bearing surfaces 222 for receiving the rounded supporting surfaces 218 of the elongated hinge members 206.

The feed tube cover support blocks 220 also define stops 220A and 220B which are engaged by corresponding surfaces 206A and 206B of the elongated hinge members 206 for defining the opened and closed positions of the feed tube cover 200, respectively. To prevent removal of the feed tube cover 200 when in the closed or operating position over the feed tube 134, the elongated hinge members 206 include depending fingers 224 which engage mating holes 226 formed into the upper surface of the bowl cover 128.

A primary food pusher 250 is coupled to the feed tube cover 200 such that it is aligned with the feed tube 134 for reciprocating motion therein when the feed tube cover 200 is in its closed position over the feed tube 134. The food pusher 250 comprises a pusher plate 252 having an upwardly extending flange 254 and being sized to slidingly fit within the feed tube 134 for pushing food therethrough. A pusher shaft 256 is fixedly connected to the pusher plate 252 and is sized to be received through the centralized opening or aperture 204 in the feed tube cover 200.

To ensure that the pusher plate 252 does not engage the cutting disc 112 or other processing tool within the upper extremes of the working bowl 114, tabs 258 are formed to extend from the outer surface of the upper end of the pusher shaft 256. The tabs 258 are sized and positioned to be received within notches 260 formed in the edges of the central aperture 204 through the feed tube cover 200. While two tabs 258 and notches 260 are shown in the illustrative embodiment, any reasonable number of such tabs and notches can be used in the present invention.

The pusher shaft 256 must be rotated to a position where the pusher plate 252 is not aligned with the feed tube 134 for the tabs 258 to be aligned with the notches 260 such that the pusher shaft 256 can be inserted upwardly through the central aperture 204. The pusher shaft 256 is then rotated to align the pusher plate 252 with the feed tube 134 when the feed tube cover 200 is moved to the closed position over the feed tube 134. Thus positioned, the tabs 258 engage the upper surface of the feed tube cover 200 when the primary food pusher 250 is lowered into the feed tube 134 as shown by dash-dot lines in FIG. 3. In this way, the tabs 258 ensure that the pusher plate 252 is supported a slight distance above the cutter disc 112 or other food processing tool to prevent damage to the food processor.

A pusher head 262 which is larger than the central aperture 204 through the feed tube cover 200 is secured to the pusher shaft 256 on the upper side of the feed tube cover 200 for operation of the primary food pusher 250. Preferably, the pusher head 262 is removably secured to the pusher shaft 256 as shown in the illustrative embodiment to enable disassembly of the primary food pusher 250 from the feed tube cover 200 for cleaning purposes. Advantageously, the pusher head 262 may be secured to the food pusher shaft 256 by means of cammed surfaces 264 formed around the base of the pusher head 262 and the upper end of the pusher shaft 256. The cammed surfaces 264 permit the pusher head 262 to be secured to or freed from the pusher shaft 256 by relative twisting motions of a limited extent.

To facilitate pivotal movement of the feed tube cover 200 between the closed and opened positions, the feed tube cover 200 and primary food pusher 250 include support means for retaining the primary food pusher 250 in a raised position with the pusher plate 252 adjacent to the underside of the feed tube cover 200. The raised position of the primary food pusher 250 is shown in FIGS. 1 and 3.

The support means comprises projection means which, in the illustrative embodiment, form a concentric raised rib 266 in the outer surface of the pusher shaft 256. Retaining means for engaging the projection means form at least a portion of the centralized aperture 204 through the feed tube cover 200. In the illustrative embodiment, the retaining means comprise two opposed strips 268 of the feed tube cover defined by slots 270 which extend outwardly from the central aperture 204 through the feed tube cover 200. The retaining means or strips 268 are sized and of sufficient resiliency to retain the primary food pusher 250 in its raised position, yet permit the projection means or raised rib 266 to move past the retaining means upon application of a defined force on the primary food pusher 250.

Other support means may be utilized in the present invention as will be apparent to those skilled in the art. For example, a tab or finger 271, as shown in FIG. 3, can be formed on the latching member 212 to extend beneath the pusher plate 252 when the latching member 212 is moved toward the feed tube 134.

In the preferred embodiment of the primary food pusher 250, the pusher shaft 256 is hollow and open at both ends with the opening through the pusher shaft 256 extending through the pusher plate 252 as shown in FIG. 3. The hollow pusher shaft 256 thus defines a reduced diameter secondary feed tube 272 through the food pusher 250 when the hollow pusher shaft 256 is coupled to the feed tube cover 200, in its lowered position and the pusher head 262 has been removed therefrom. In the illustrated embodiment, the pusher head 262 comprises a secondary shaft 274 which extends from the pusher head 262 and is sized to be slidingly received within the hollow pusher shaft 256.

The secondary shaft 274 of the pusher head 262 extends through the hollow pusher shaft 256 such that the closed lower end 275 of the secondary shaft 274 completes the food pushing surface of the pusher plate 252 as best seen in FIG. 3. In the preferred embodiment of the present invention, the secondary shaft 274 of the pusher head 262 is inserted into the hollow pusher shaft 256 with the pusher head 262 being secured to the pusher shaft 256 by means of the cammed surfaces 264 to form the primary food pusher 250 which is reciprocated within the feed tube 134. When the pusher head 262 is loosened from the hollow food pusher shaft 256, the closed shaft 274 of the pusher head 262 may be withdrawn from the hollow pusher shaft 256 to access the secondary feed tube 272 and reinserted thereinto for use as a secondary food pusher.

The latching member 212 serves to secure the feed tube cover 200 in its closed position over the feed tube 134 by being pulled or slid toward the distal end of the tab 210. As the latching member 212 slides toward the end of the tab 210, flanges 212A engage extensions 136A on an enlarged upper portion 136B of the channel 136. As best seen in FIG. 3, a cam surface 212B depresses the interlock activating rod 138 which, in turn, depresses the interlock activating rod 118 to operate the switch 106 via the activating pin 122. The interlock activating rod 138 is held in its depressed position by the underside of the rib the forward edge of which defines the cam surface 212B. The latching member 212 is permanently coupled to the tab 210 by means of thermally deforming the latching member 212 or otherwise, as will be apparent to those skilled in the art, such that it cannot be removed therefrom.

Operation of the food processor 100 with the improved feed tube protector of the present invention will now be described. The primary food pusher 250 is initially assembled to the feed tube cover 200 by properly orienting the primary pusher shaft 256 such that the tabs 258 pass through the notches 260. The pusher shaft 256 is then reoriented such that the pusher plate 252 is aligned with the feed tube 134 when the feed tube cover 200 is hingedly connected to the bowl cover 128 and moved to its closed position over the feed tube 134.

The secondary shaft 274 of the pusher head 262 is then inserted into the hollow pusher shaft 256, i.e., the secondary feed tube 272, and the pusher head 262 is secured to the pusher shaft 256 by engagement of the cammed surfaces 264 to form the primary food pusher 250. The primary food pusher 250 is then moved to its raised position where it is secured by the rib 266 which is engaged by the strips 268.

The elongated members 206 are grasped by the hand of an operator and squeezed to deform the members 206 toward one another such that the hinge pins 208 can be fitted between the hinge brackets 214 and engaged within the keyway slots 216 formed therein. This positions the rounded supporting surfaces 218 of the elongated hinge members 206 within the rounded bearing surfaces 222 of the feed tube cover support blocks 220.

Once the feed tube cover 200 is thus mounted on the bowl cover 128, it may be hingedly moved between the opened position retracted from the feed tube 134, shown in dash-dot lines in FIG. 1, and the closed position over the feed tube 134, shown in solid lines in FIG. 1. In the opened or retracted position, the opening to the feed tube 134 is accessible for loading food to be processed by the food processor thereinto. After the feed tube 134 is filled with the food to be processed, the feed tube cover 200 is pivoted about the elongated hinge members 206 to the closed position over the feed tube 134.

It is noted that the operator controls 108 and the feed tube 134 are positioned on one side of the food processor 100 while the feed tube cover 200 is pivoted to the opposite side of the food processor 100 for opening the feed tube 134. By moving the feed tube cover 200 away from the operator controls 108 and hence the operator of the food processor 100, the operator is afforded unrestricted access to the opening of the feed tube 134 which is conveniently positioned over the operator controls 108.

During pivotal movement of the feed tube cover 200, the primary food pusher 250 is retained in its raised position by means of the rib 266 which is held above the feed tube cover 200 by the resilient strips 268. As previously described, in the raised position the food pusher 250 does not interfere with the pivotal movement of the feed tube cover 200.

Once moved into the closed position over the feed tube 134, the feed tube cover 200 is secured to the feed tube 134 of the bowl cover 128 by moving the latching member 212 to its forwardmost position on the tab 210 such that the flanges 212A engage the tabs 136A. The cam surface 212B depresses the interlock activating rods 138 and 118 which, in turn, operate the interlock switch 106 by means of the activating pin 122.

The food processor 100 can then be activated by operation of the operator controls 108 which have been enabled by operation of the interlock switch 106. Food which was previously loaded into the feed tube 134 is then forced through the feed tube 134 by the food pusher 250 into engagement with the cutting disc 112 or other food processing tool attached to the drive shaft 110. The motor 104 is then deactivated by the operator of the food processor 100. The primary food pusher 250 is lifted to its raised position once more so that the feed tube cover 200 can be pivoted to the opened or retracted position for depositing additional food to be processed into the feed tube 134. Additional loads of food are then processed as just described.

If a narrower feed tube is adequate for food items to be processed, the secondary feed tube 272 may be utilized. For use of the secondary feed tube 272, the primary food pusher 250 is placed in its lowered position within the primary feed tube 134 such that the tabs 258 engage the upper surface of the feed tube cover 200. The pusher head 262 is then twisted relative to the pusher shaft 256 to disengage the cammed surfaces 264. The secondary shaft 274 of the pusher head 262 may then be removed from the secondary feed tube 272 defined by the hollow pusher shaft 256. Since the latching member 212 is still in its locked position, as shown in FIG. 3, the interlock switch 106 remains activated and the drive motor 104 can be operated by means of the operator controls 108.

Accordingly, with the pusher head 262 and secondary shaft 274 removed from the secondary feed tube 272, long narrow food products to be processed may be inserted thereinto. The food processor 100 can then be activated by means of the operator controls 108 and the long narrow food products inserted into the secondary feed tube 272 can be pushed therethrough by inserting the secondary shaft 274 into the secondary feed tube 272 wherein it functions as a secondary food pusher. Advantageously, the elements making up the improved feed tube protector of the present invention may be disassembled as shown in the exploded view of FIG. 4 to facilitate cleaning of the food processor with the exception of the latching member 212 which is permanently mounted to the tab 210 as previously described. Also, the parts of the feed tube cover are preferably made of a dishwasher-safe plastic to enable thorough dishwasher cleaning.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. In a food processor having a base containing a drive motor and control means for enabling the operation of said drive motor, a working bowl detachably secured to said base, a shaft projecting upwardly through said bowl and being coupled to said drive motor for rotation of a food processing tool coupled to said shaft within said bowl, and a bowl cover detachably secured to said bowl and defining a feed tube for introducing food items through said bowl cover into said bowl, an improved feed tube protector comprising:
    a feed tube cover;
    hinge means for hingedly mounting said feed tube cover to said bowl cover for pivotal movement of said feed tube cover between a closed position over said feed tube and an opened position retracted from said feed tube;
    a food pusher coupled to said feed tube cover and aligned with said feed tube when said feed tube cover is in said closed position for pushing food through said feed tube;
    latch means movable between a released position and a secured position for securing said feed tube cover to said bowl cover; and
    interlock means on said bowl cover activated by said latch means for operating said control means to enable the operation of said drive motor only when said bowl, said bowl cover and said feed tube cover are properly secured to one another and to said base.

2. An improved feed tube protector as claimed in claim 1 wherein said feed tube cover includes a central opening and said food pusher comprises:
    a pusher plate formed to slidingly fit within said feed tube;
    a pusher shaft fixedly connected to said plate and extending through said centralized opening of said feed tube cover; and
    a pusher head larger than said centralized opening of said feed tube cover for operation of said food pusher, said pusher head being removably secured to said pusher shaft to enable disassembly of said food pusher from said feed tube cover to facilitate cleaning.

3. An improved feed tube protector as claimed in claim 2 further comprising support means for retaining said food pusher in a raised position whereby pivotal movement of said feed tube cover between said closed and opened positions is facilitated.

4. An improved feed tube protector as claimed in claim 2 wherein intermating cammed surfaces are formed on said pusher head and said pusher shaft whereby said pusher head can be secured to or freed from said pusher shaft by relative twisting motions of limited extent.

5. An improved feed tube protector as claimed in claim 1 wherein said hinge means are separable such that an operator can detach said feed tube cover from said bowl cover to facilitate cleaning.

6. An improved feed tube protector as claimed in claim 5 wherein said hinge means further comprises feed tube cover securing means for preventing removal of said feed tube cover from said bowl cover when said feed tube cover is in said closed position.

7. In a food processor having a base containing a drive motor and control means on one side thereof for enabling the operation of said drive motor from said one side, a working bowl detachably secured to said base, a shaft projecting upwardly through said bowl and being coupled to said drive motor for rotation of a food processing tool coupled to said shaft within said bowl, and a bowl cover detachably secured to said bowl and defining a feed tube positioned adjacent said control means within easy reach of an operator when said bowl cover is secured to said bowl, said feed tube permitting food items to be passed through said bowl cover and into said bowl, an improved feed tube protector comprising:
    a feed tube cover movable between a closed position over said feed tube and an opened position to the side of said food processor opposite to said one side and away from said feed tube to thereby expose said feed tube for loading food to be processed thereinto;
    hinge means for hingedly mounting said feed tube cover to said bowl cover for pivotal movement between said opened and closed positions;
    a food pusher coupled to said feed tube cover and aligned with said feed tube when said feed tube cover is in said closed position for pushing food through said feed tube into engagement with said processing tool;
    latch means for securing said feed tube cover to said bowl cover in said closed position; and
    interlock means for enabling operation of said control means only when said bowl, bowl cover and feed tube cover are in operative position and are properly secured to one another and to said base.

8. An improved feed tube protector as claimed in claim 7 wherein said food pusher is constructed to be completely disassembled from said feed tube cover and is made of a dishwasher-safe plastic, enabling thorough dishwasher cleaning of the disassembled parts.

9. An improved feed tube protector as claimed in claim 8 wherein said feed tube cover has a centralized opening therein for passage therethrough of said food pusher and wherein said feed tube open top is of a size to admit insertion of an adult hand, but said centralized opening is dimensioned to prevent insertion of a normal adult hand.

* * * * *